United States Patent [19]
Wuebbels et al.

[11] Patent Number: 5,722,225
[45] Date of Patent: Mar. 3, 1998

[54] MACHINE FOR MOWING AND CHOPPING CORN AND SIMILAR STALK-LIKE HARVESTED CROPS INDEPENDENTLY OF THE ROW

[75] Inventors: Richard Wuebbels, Borken; Norbert Wolters, Gescher, both of Germany

[73] Assignee: Maschinenfabrik Kemper GmbH, Sadtlohn, Germany

[21] Appl. No.: 701,317

[22] Filed: Aug. 22, 1996

[30] Foreign Application Priority Data

Aug. 30, 1995 [DE] Germany ............ 195 31 918.4

[51] Int. Cl.⁶ .................................................... A01D 45/02
[52] U.S. Cl. ........................... 56/60; 56/92; 56/94; 56/119
[58] Field of Search ................................. 56/6, 53, 57, 65, 56/73, 80, 84, 92, 94, 102, 109, 119, 60

[56] References Cited

U.S. PATENT DOCUMENTS

| | | | |
|---|---|---|---|
| 1,901,099 | 3/1933 | Hale | 56/102 |
| 4,594,842 | 6/1986 | Wolters et al. | 56/94 |
| 4,691,504 | 9/1987 | Glunk | 56/6 X |
| 4,961,305 | 10/1990 | Ostrup et al. | 56/102 X |
| 5,237,804 | 8/1993 | Bertling | 56/102 X |
| 5,444,968 | 8/1995 | Barton | 56/119 |
| 5,651,243 | 7/1997 | Arnold et al. | 56/94 |

FOREIGN PATENT DOCUMENTS

| | | | |
|---|---|---|---|
| 2848450 | 5/1979 | Germany | 56/94 |
| 3909754 | 10/1989 | Germany | 56/53 |

*Primary Examiner*—John A. Ricci
*Attorney, Agent, or Firm*—Jordan and Hamburg

[57] ABSTRACT

In the case of a machine for mowing and chopping corn and other similar stalk-like harvested crops, independently of rows, with at least two drawing-in and mowing drums disposed on either side of the vertical, central longitudinal plane of the machine, the cut, harvested crops are supplied to a central chopper over conveying ducts comprising vertical guiding walls. Towards the chopper and in plan view, the guiding walls have the shape of a wave traveling at right angles to the longitudinal, central plane of the machine. As seen in the driving direction, in each region of the wave crests between two adjacent drawing-in and mowing drums, a transverse conveying drum with protruding driving teeth is provided. Through opening slots in the guiding walls, the driving teeth intervene in the conveying duct for the cut, harvested crops.

24 Claims, 4 Drawing Sheets

MACHINE FOR MOWING AND CHOPPING CORN AND SIMILAR STALK-LIKE HARVESTED CROPS INDEPENDENTLY OF THE ROW

BACKGROUND OF THE INVENTION

The invention relates to a machine for mowing and chopping corn and other similar stalk-like harvested crops, independently of the row, particularly harvested crops for whole-plant silage.

For such a known machine (European Patent 0 099 527), which is frequently also referred to as a corn mower-chopper, the stalks of the harvested crops are drawn-in in the upright position and mown and subsequently supplied to the chopper by means of insertion rollers, which are connected in series. A mode of operation of the drawing-in and mowing drums, independent of the distance between and the direction of the rows of the harvested crops, is achieved by means of a plurality of feeding and cutting sites, which are distributed over the front working region of the machine, so that the machine can also be used for crops from broadcast seed, in much the same way as a combine can be used for grain. Moreover, bent harvested crops, such as "Lagermais" (stored corn) can also be picked up satisfactorily with the help of the driving teeth, provided at the drawing-in and mowing drums.

Under operating conditions, however, during the conveying of the cut, harvested crops by the outer drawing-in and mowing drums over the inner drawing-in and mowing drums, acting as transfer organ, to the feeding rollers of the chopper for the bundled feeding of the harvested crops into the feeding gap, it has turned out that difficulties can arise, which depend on the harvested crops and occur increasingly as the working width of the machine increases, for example, to about 6 m, and the number of drawing-in and mowing drums increases correspondingly, because of the longer conveying paths.

SUMMARY OF THE INVENTION

It is therefore an object of the invention to provide a machine for mowing and chopping corn and other similar stalk-like harvested crops, with which these harvested crops can be fed reliably and quickly into the feeding gap of the feed rollers of the chopper in bundled, combined form even when the machine has a large working width.

In the case of the inventive embodiment of a corn mower/chopper, the guiding walls to the chopper have, seen in plan view, the shape of a wave, which travels transversely to the central longitudinal plane of the machine and the wave shape of which preferably corresponds to that of a flat sine curve. The flat wave shape favors a gentle, rapid conveying of the cut, harvested crops through the conveying ducts from the outer drawing-in and mowing drums over the inner drawing-in and mowing drums, which at the same time act as transfer organs, by means of their driving teeth towards the chopper. The conveying of the harvested crops is supported by the transverse conveying drums which, in the gusset region between two neighboring drawing-in and mowing drums, are disposed behind these drums in the driving direction and, with their protruding driving teeth, pass through opening slots in the wave-shaped guiding wall as they revolve and engage the guiding duct for the cut, harvested crops. The gusset regions are recognized as being critical for the conveying of the harvested products. Due to the use of these transverse conveying drums at these gusset regions between two drawing-in and mowing drums, which follow one another towards the chopper, especially close to the vertical central longitudinal plane of the machine, conveying problems are largely avoided even in the case of large working widths up to about 6 m, for which a total of eight drawing-in and mowing drums, in each case four on either side of the vertical, central longitudinal plane of the machine, can be provided.

In the description below, the invention is explained in greater detail with further distinguishing features and advantages by means of a drawing, in which an example of the object of the invention is illustrated diagrammatically.

IN THE DRAWINGS

FIG. 1 shows a plan view of the, in the driving direction, front region of the machine with a total of eight drawing-in and mowing drums and a chopper, which is merely indicated by its insertion rollers, FIG. 2 shows a plan view of half the machine of FIG. 1 on an enlarged scale, FIG. 3 shows a perspective view of the machine, limited once again to half the machine, with regions, in which components have been omitted or are only indicated, in order to illustrate certain details of the machine, and FIG. 4 shows a section along the line IV—IV of FIG. 2.

DESCRIPTION OF THE PREFERRED EMBODIMENT

Figure 1:
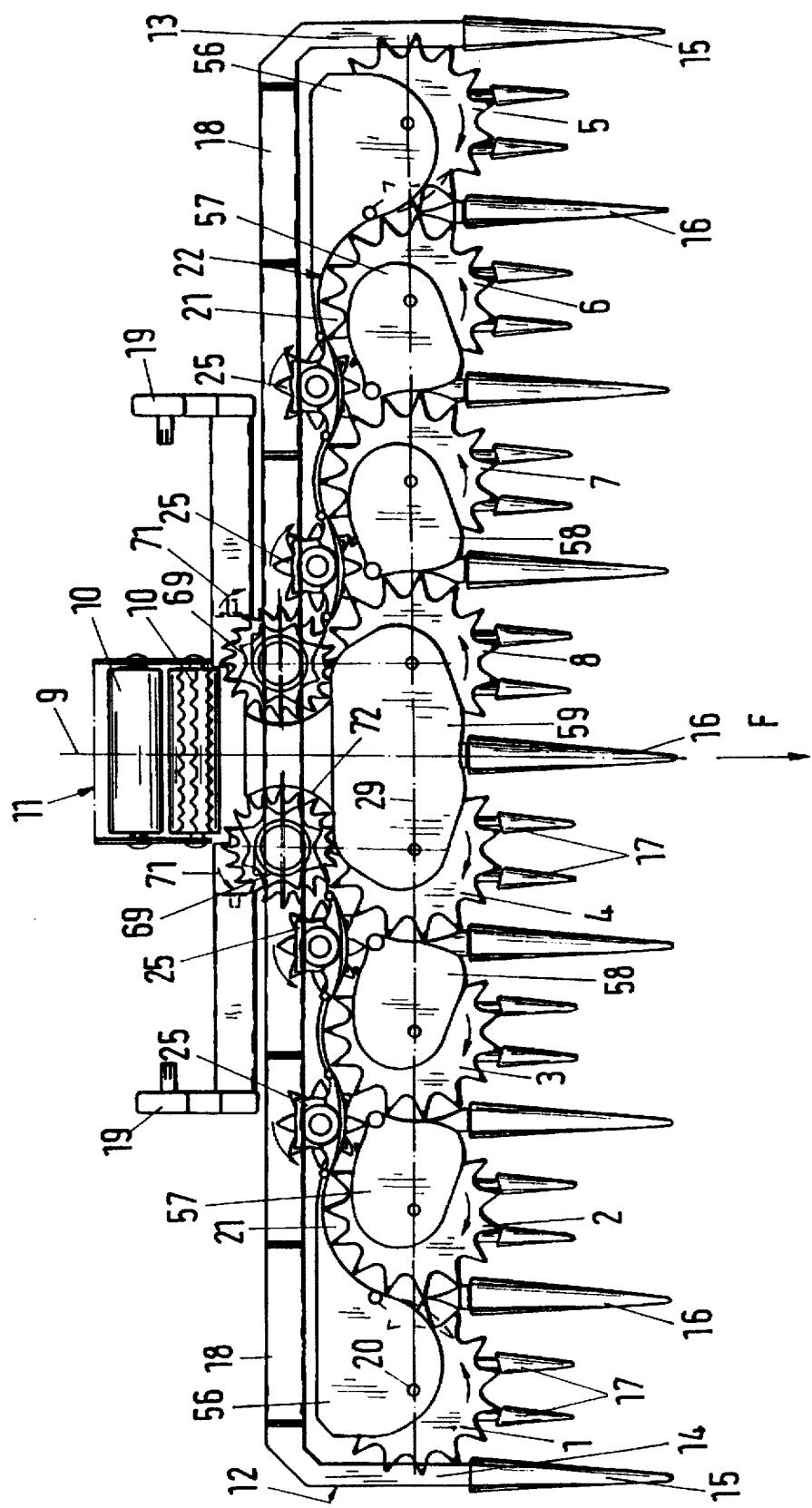

The machine, advanced in the working or driving direction of arrow F in FIG. 1 can, as for the example shown, be constructed as an attachment for a tractor or also as a self-propelling vehicle and comprises, in the case of the examples shown, a total of eight drawing-in and mowing drums 1 to 8, of which the drawing-in and mowing drums 1 to 4 are disposed on the one side and the drawing-in and mowing drums 5 to 8 are disposed on the other side of a vertical, central, longitudinal plane 9, which forms a plane of symmetry for the machine to the extent shown. In the driving direction F, the drawing-in and mowing drums 1 to 8 are in turn disposed ahead of the chopper 11, which is only indicated with its predisposed insertion rollers 10. The insertion rollers 10 define a horizontal feeding gap for the cut, harvested products.

The drawing-in and mowing drums 1 to 8 are surrounded at the sides and back by a machine frame 12, which is open at the front in the driving direction F. The machine frame 12 comprises lateral guides 13 and 14, which together determine the working width of the machine. The lateral guides 13 and 14 in each case run out to a divider point 15 at the front, which acts as leaf lifter for the harvested products and prepares the mowing cut. Within the working width of the machine, in the region in front of the gusset between in each case two adjacent drawing-in and mowing drums 1 to 8, further dividing points 16 of the same length as the dividing points 15 are disposed and, between the dividing points 15, 16, there are two short dividing points 17 at a distance from one another. The dividing points 16 and 17 are fastened below the machine frame 12 in a manner, the details of which are not shown.

On the reverse side of the machine frame 12, on either side of the vertical, central longitudinal plane 9, a frame tube 18 is fixed, which in each case contains a main driving connection for the drawing-in and mowing drums 1 to 4 or 5 to 8. In each case, the motive power is received from a central transmission of the chopper 11 over a spur gearing 19 and transmitted to the respective main driving connection in the frame tube 18. The individual drawing-in and mowing drums 1 to 8 are driven for their rotation at the same peripheral speed about a vertical or at least essentially vertical axis of rotation 20 by the main driving connection over miter gears. In each case, between the adjacent divider points 15, 16, 17, a drawing-in and cutting site for the stalk material to be harvested is formed. The latter is then conveyed by the drawing-in and mowing drums 1 to 8, the direction of rotation of which is indicated in each case by an arrow, through a conveying duct 21 on the one or the other side of the vertical, central longitudinal plane, to the chopper 11.

The conveying ducts 21 are constructed in mirror-image fashion on either side of the vertical, central longitudinal plane 9, so that they are explained adequately by describing one conveying duct 21. For this purpose, reference is made to FIGS. 2 and 3, which illustrate the conveying duct 21 of the right half of FIG. 1 together with the drawing-in and mowing drums 5 to 8.

At the, in the driving direction F, front side of the drawing-in and mowing drums 5 to 8 and at the, in the driving direction F, rear side adjoining the periphery of the drawing-in and mowing drums 5 to 8, the conveying duct 21 is bounded by a guiding wall, which is firmly attached to the machine. The guiding wall 22 is fixed to the machine frame 12 in a manner, the details of which are not shown. In plan view, the guiding wall 22 has the shape of a wave traveling in the form of a flat sine curve transversely to the central longitudinal plane 9 of the machine with, as seen in the driving direction F, wave valleys 23 and wave crests 24 following the periphery of the drawing-in and mowing drums 5 to 8 in the gusset region between two adjacent drawing-in and mowing drums 6, 7 or 7, 8.

A transverse conveying drum 25 for the cut, harvested crops is disposed in the gusset region between the mowing drums 6, 7 and 7, 8, that is, assigned to each wave crest 24. Like the drawing-in and mowing drums 5 and 8, said transverse conveying drum 25 is provided with protruding driving teeth 26 and rotates about an essentially vertical axis 27. The driving teeth 26 reach through opening slots 28 in the guiding wall 22 into the conveying duct 21 for the cut, harvested crops. The transverse conveying drums 25 are adapted in size to the gusset region between two adjacent drawing-in and mowing drums 1 to 8, and are constructed appropriately smaller than these. In the case of the example shown, the diameter of the transverse conveying drums 25, including the protruding driving teeth 26 is only about half the diameter of the drawing-in and mowing drums 1 to 8 including the driving teeth.

A construction of the drawing-in and mowing drums 5 to 8 with an identical diameter and their arrangement, with their axes of rotation 20 aligned, in a common transverse plane 29, which is orthogonal to the central longitudinal plane 9, corresponds to the described construction of the guiding wall 22.

There is no transverse conveying drum in the gusset region between the outer drawing-in and mowing drum 5 and the next adjoining drawing-in and mowing drum 6. In this region, the flat sine wave of the guiding wall 22 changes over into an arched contour, which matches the drum periphery 30 of the outer drawing-in and mowing drum 5. Moreover, in the end region of the guiding wall 22, a stripper 31, which is extended to the periphery 30 of the drawing-in and mowing drum 5, is provided with opening slots 32 for the driving teeth 33 protruding from the drawing-in and mowing drum 5. The stripper 31 is supported at the machine frame 12 by means of a vertical column 34.

In principle, the outer drawing-in and mowing drum 5 could also have other dimensions, particularly a larger diameter, than those of the drawing-in and mowing drums 6 to 8, which adjoin towards the inside in the direction of the chopper 11. Conveying problems arise only with the drawing-in and mowing drums 6 to 8, which adjoin towards the inside in the direction of the chopper 11, due to the increasing flows of harvested crops, which are produced by each drawing-in and mowing drums 5 to 8 and finally must be transferred combined to the insertion rollers 10 of the chopper 11. The transverse conveying drums 25 support this conveying motion of the harvested crops streams in the gusset region between the inner drawing-in and mowing drums 6 to 8.

Figure 2:
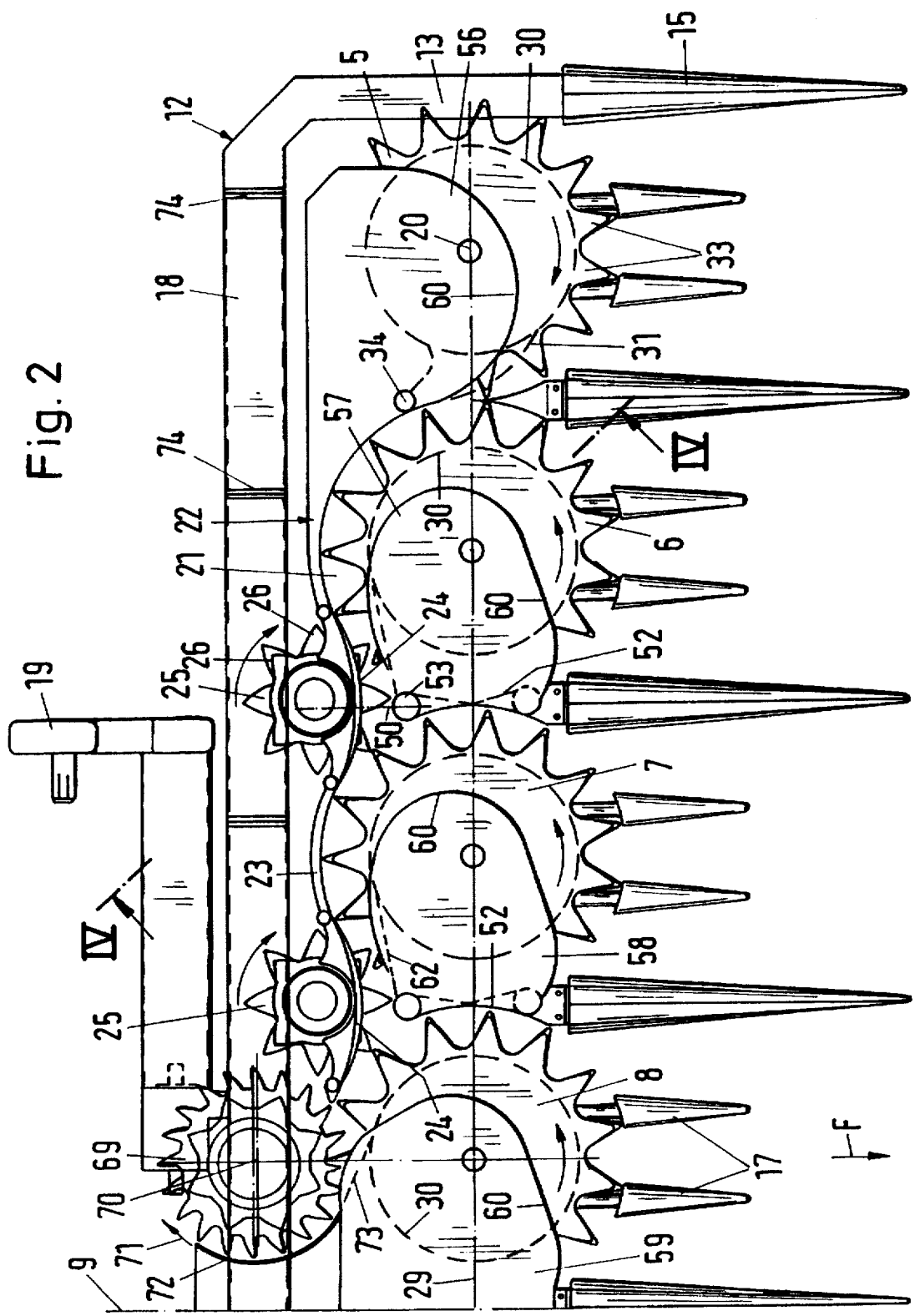
Figure 3:
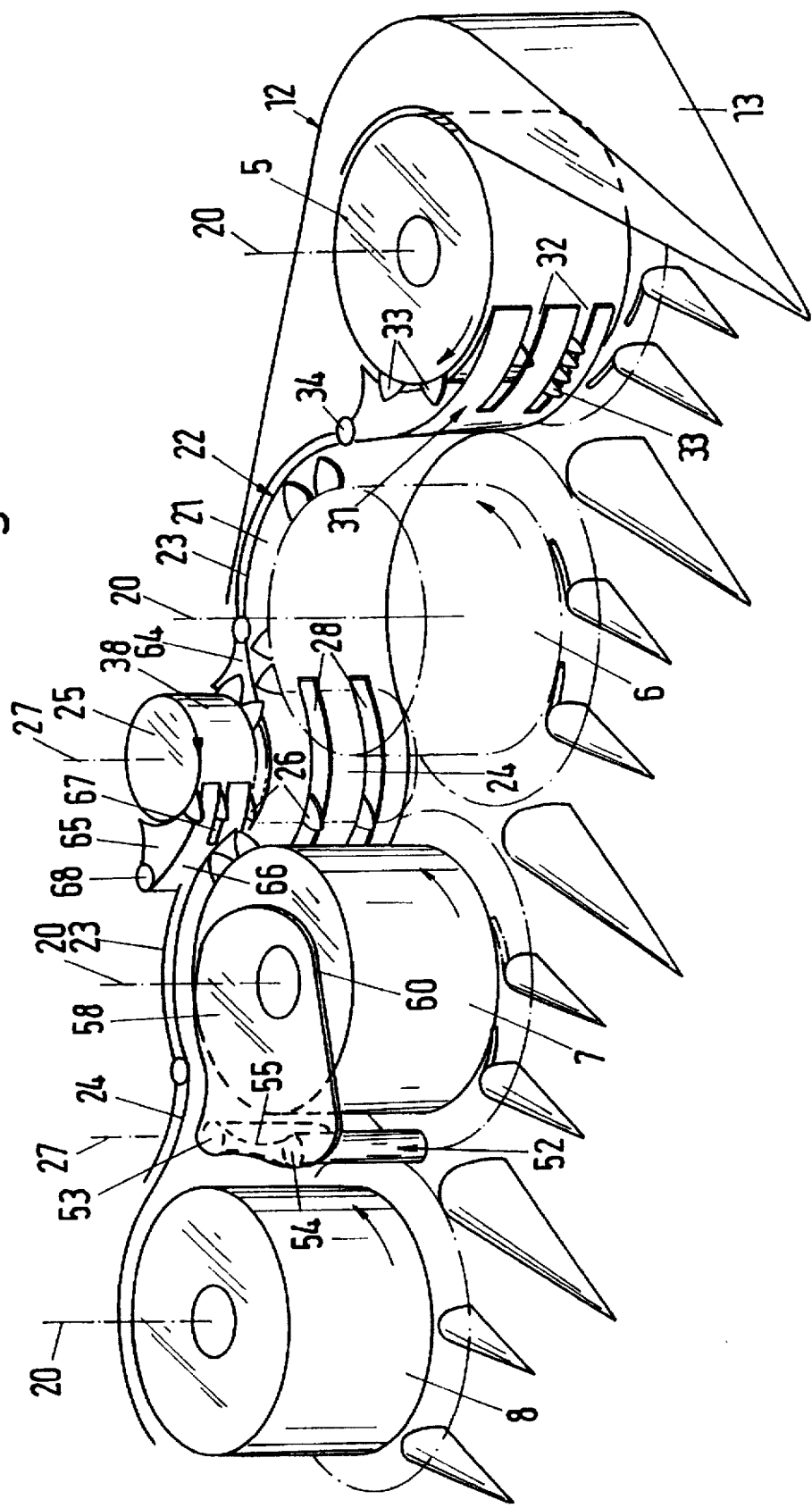

As can be seen particularly clearly in FIGS. 2 and 3, there are no opening slots, such as slots 28, in the guiding wall 22 in the region of the wave valleys 23 assigned to the periphery 30 of the drawing-in and mowing drums 6 to 8. This favors a gentle, swift conveying of the harvested crops along the guiding wall 22, which is left smooth here, by means of the driving teeth 33 of the drawing-in and mowing drums 1 to 8. The driving teeth 26 of the transverse conveying drums 25 engage the conveying duct 21 only in the gusset region between two drawing-in and mowing drums 6 to 8, which follow one another in the inwards direction, as a result of which a tendency of partial streams of harvested crops, coming together in the gusset region, to accumulate, is counteracted.

Figure 4:
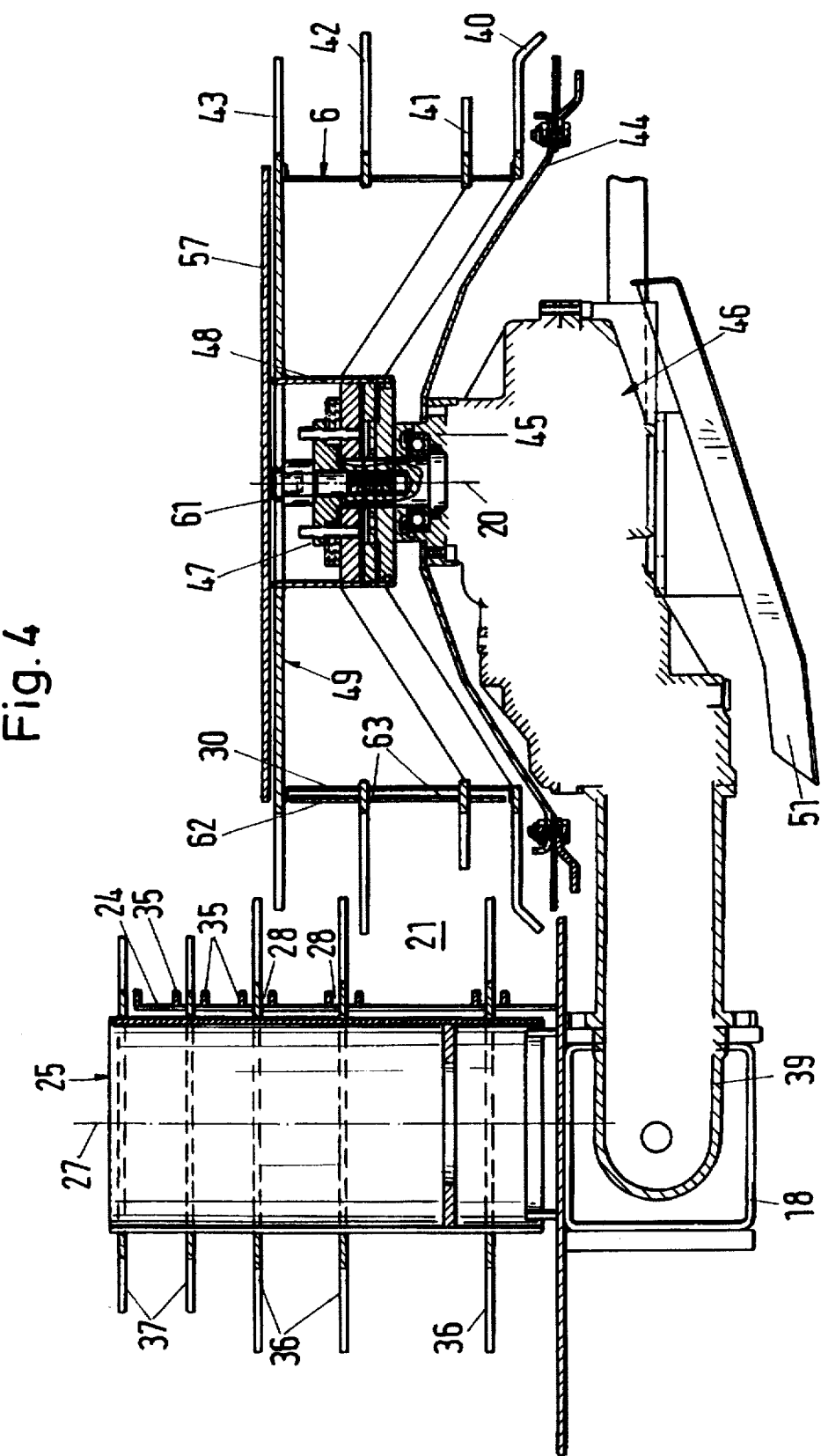

Moreover, as shown in FIG. 4, the opening slots 28 for the guiding teeth 26 of the transverse conveying drums 25 are bordered in the region of the wave crest 24 by protruding cam strips 35, which extend in the longitudinal direction of the slots and, on the one hand, stiffen the guiding wall 22 in this region and, on the other, bring about an interruption or loosening in the surface. This interruption or loosening, in turn, prevents jamming of the harvested crops in this transition region between two drawing-in and mowing drums 6, 7 and 7, 8.

FIG. 4 furthermore shows the construction of the transverse conveying drums 25 with, in the case of the examples shown, five rims 36 and 37 of driving teeth 26, which are disposed at a vertical distance above one another and the triangular basic configuration of which, with outwardly protruding triangular points, can be seen in FIGS. 1 to 3. The toothed rims 36 and 37 are fixed to the outer periphery 38 of a cylindrical tubular body. The first radial distance of the lower three toothed rims 36 from the periphery 38 of the drum is larger than that of the upper two toothed rims 37.

The toothed rims 37 are disposed in a region of the vertical extent of the transverse conveying drums 25, with which the latter rise above the drawing-in and mowing drums 5 to 8, of which the drawing-in and mowing drum 6 is shown in a sectional view in FIG. 4. For revolving about the vertical axes of rotation 27 with a peripheral speed, corresponding to that of the drawing-in and mowing drums 5 to 8, the transverse conveying drums 25 each are driven with miter gears, which are connected with the main driving connection in the frame tube 18 and indicated in FIG. 4 merely by a gear housing 39.

By means of the drawing-in and mowing drum 6, FIG. 4 furthermore shows the construction of the drawing-in and mowing drums 1 to 8, which are identical, with three rims 40 to 43 of driving teeth, which are disposed at vertical intervals above one another. Of these, driving teeth 33 of rims 41 to 43 have the basic triangular shape with outwardly directed triangular points, which can be seen in FIGS. 1 to 3, while the driving teeth of the lower rim 40 can have a downwardly angular shape, for example, a trapezoidal shape tapering to the outside, as is appropriate for interaction with the circular mowing blade 44 revolving directly below the toothed rim 40, for example, in the form of a saw rotor.

When the machine is running, the peripheral speed of the mowing blade 44 is greater than that of the toothed rims 40 to 43, so that the stem material is severed by the mowing blades 44 a short distance above the ground, as if by a rotary mower. For this purpose, the circular mowing blade 44 is fastened with its inner edge to a driven part 45 of the miter gear for the drawing-in and mowing drum 6, which driven part is rotating at an appropriate high angular velocity and connected with the main driving cord in the frame robe 18. In FIG. 4, the miter gear is indicated only diagrammatically by a housing 46.

Furthermore, over a coupling 47 with an appropriate gear reduction, a drum body 49, which defines the cylindrical extent 30 of the drawing-in and mowing drums 1 to 8 and is fixed with a central hub 48 to this coupling 47, is driven by the miter gear 46. The toothed rims 40 to 43, protruding horizontally and radially from the periphery 30, just like the toothed rims 36 and 37 of the transverse conveying drums 25, are supported at the drum body 49 for their rotation about the axis of rotation 20 coinciding with the axis of rotation of the mowing blades 44. In this region of the conveying duct 21, the toothed rims 40 to 43 of the drawing-in and mowing drum 6 act together with the toothed rims 36 of the transverse conveying drum 25 for conveying the harvested crops. Any stalk material which, in the course of being conveyed to the chopper 11, has been pushed up over the upper side of the drawing-in and mowing drum 6, is conveyed further by the toothed rims 37 rising above the drawing-in and mowing drum 6.

FIG. 4 furthermore shows one of several undercarriage skids 51 on the underside, by means of which the machine rests on the ground and which, in turn are supported at the machine frame 12.

For carrying out a conveying motion in the conveying duct 21 in collaboration with the drawing-in and mowing drums 6, 7 and 7, 8, each transverse conveying drum 25 has a direction of rotation, indicated by the arrows drawn, which is opposite to that of the two drawing-in and mowing drums 6, 7 or 7, 8, to which they are assigned in the gusset region. A partition 52, which prevents a harvested crops-conveying interaction between the two drawing-in and mowing drums 6, 7 or 7, 8 in their drum gap, is disposed in front of (as seen in the driving direction F) each transverse conveying drum 25 in the gap between the two in each case adjacent drawing-in and mowing drums 6, 7 and 7, 8. As is particularly evident also from FIG. 3, the partition 52 is formed by two vertical columns 53 and 54, supported on the underside of the machine frame 12, and two guide plates 55, which extend between these columns 53 and 54 and are constructed in an arched manner to correspond to the periphery 30 of the drawing-in and mowing drum 6, 7 or 7, 8 facing them.

Such a partition 52 is missing in the gap between the outer drawing-in and mowing drum 5 and the next adjoining drawing-in and mowing drum 6. The drawing-in and mowing drums 5 and 6 have opposite directions of rotation here and, in an appropriately narrow spacing in the direction of the transverse plane 29 of the machine, jointly form a conveying gap for the harvested crops cut by them.

On the upper side, the drawing-in and mowing drums 1 to 8 are covered by coveting plates 56 to 59, rigidly connected to the machine, in the region of their, relative to the chopper 11, retrograde rotation sector. As shown in FIG. 4 for the covering plate 57 assigned to the drawing-in and mowing drum 6, the covering plates 56 to 59 are bolted in a stationary manner by means of a bolt 61 with the coupling 47 as a first fastening site. At least one further fastening site for fixing the covering plates 56 to 59 firmly to the machine is formed by the column 34 for the covering plate 56 and by the column 53 for the coveting plates 57 and 58. The central covering plate 59, which extends on either side of the vertical, central longitudinal plane 9 of the machine, is assigned jointly to the two inner drawing-in and mowing drums 4 and 8 and fastened centrally at the two drums, as described for the covering plate 57 of the drawing-in and mowing drum 6. Further fastening sites may be provided in a manner, the details of which are not shown, on the machine frame 12, for example, in an elongated region of the covering plate 59 extending towards the chopper 11.

As seen in the driving direction F, the distance between the outer edge 60 of the coveting plates 57 and 58 from the circle formed by the feet of the driving teeth 33 of the drawing-in and mowing drum 6, 7, which circle corresponds essentially to the drum periphery 30, is large in the front region of the drawing-in and mowing drum 6, 7 and decreases towards the rear end of the drawing-in and mowing drum 6, 7 to the height of the circle formed by the feet of the teeth and runs out tangentially to this circle. By these means, the inlet region of the drawing-in and mowing drum 6, 7, that is, the rotating sector preceding the chopper 11, is constructed aggressively and exerts a strong conveying effect on the cut, harvested crops, while the rear region, at the start of the retrograde rotating sector of the drawing-in and mowing drum 6, 7 is covered in order to counteract any unwanted reverse conveying of parts of the harvested crops.

In particular, in this connection, the outer edge 60 of the covering plate 57 or 58, in the rear region of which, facing the adjoining transverse conveying drum 25, is extended beyond the outer crown circle of the driving teeth 33 of its drawing-in and mowing drum 6 or 7 and brought close to the outer crown circle of the driving teeth 33 of the inwardly adjacent drawing-in and mowing drum 7 or 8. At the same time, the rear region of the covering plate 57, 58, together with the rear end of the partition 52, forms at the vertical column 53, a vertical guiding nose for combining the streams of harvested crops, which are being conveyed by the driving teeth 33 of the two drawing-in and mowing drums 6 and 8 or 7 and 8.

The combining of the streams of harvested crops is supported by a stripper 62 each, which is extended from the supporting column or guiding nose 53 to the periphery 30 of the outwardly adjacent drawing-in and mowing drum 7 or 6. The action of the stripper 62 corresponds to that of the stripper 31 at the outer drawing-in and mowing drum 5. In particular, FIG. 4 shows that the stripper 62 is provided with opening slots 63, through which the central toothed alms 41 and 42 extend, while the lower toothed rim 40 extends below and the upper toothed rim 43 extends above the stripper 63 radially to the outside into the conveying duct 21.

In each case, upper covering plates 64 and 65 are also assigned in their region, adjoining the guiding wall 22, to the transverse conveying drums 25, as shown particularly in FIG. 3. The covering plate 64 is disposed towards the outside, in the direction of the frame side 13, and lies approximately level with the covering 57 of the adjacent drawing-in and mowing drum 6 in such a manner that it is overlapped by the two upper toothed rims 37 of the transverse conveying drum 25. The covering plate 65 is disposed towards the inside, in the direction of the chopper 11, and extends approximately to the upper side of the transverse conveying drum 25. A vertical portion 66 of the covering plate 65 is extended to the periphery 38 of the transverse conveying drum 25 and constructed as a stripper with a central slot 67, through which the driving teeth 26 of the toothed rim 37 extend, while the driving teeth 26 of the upper toothed rim 36 and of the upper toothed rim 37 below the stripper part 66, during their rotational movement, pass through the region of the conveying duct 21. The covering plates 64 and 65 are in each case supported stationarily at the machine 12 by a vertical supporting column 68.

The outer edge 60 of the covering plate 56 of the outer drawing-in and mowing drum 5 also admittedly leaves the front or preceding part of the drawing-in and mowing drum 5, uncovered with respect to its driving teeth 33; however, it intersects the circle formed by the feet of the driving teeth 33 already shortly in front of the transverse plane 29 of the machine, as has proven to be advantageous for the cooperative action between the drawing-in and mowing drums 5 and 6 for conveying the cut, harvested crops through the gap formed between them.

Depending on the size of the machine, as determined by the number of drawing-in and mowing drums 1 to 8 used and on the therewith defined total working width and the therewith associated size of the chopper 11, particularly of the usual chopper blower wheel of the latter, there may be a vertical distance between the horizontal plane, in which the mowing blades 44 of the drawing-in and mowing drums 1 to 8 operate, and the horizontal plane of the feeding gap and defined by the insertion rollers 10 of the chopper 11. In order to bridge this vertical distance, it is advisable to dispose, in the region between the transverse conveying drum 25, closest to the vertical central longitudinal plane 9 of the machine, and the insertion rollers 10 defining the horizontal insertion gap for the chopper, in each case an obliquely conveying drum 69 on either side of the vertical, central longitudinal plane, which drum 69 in turn is provided with several spaced apart rims of protruding driving teeth. The obliquely conveying drums 69 are arranged and constructed for transferring the cut, harvested crops from the outlet end of the conveying duct 21 in each case adjoining the central, longitudinal plane 9 and for feeding the harvested crops into the feeding gap between the insertion rollers 10.

For this purpose, the two obliquely conveying drums 69 are disposed with their axes of rotation 20 in each case in a vertical plane, parallel to the vertical central longitudinal plane 9 of the machine and inclined to the working plane of the drawing-in and mowing drums 1 to 8. The driving mechanism for the obliquely conveying drums 69, revolving in the direction of arrow 71, is branched off from the main driving connection in the frame tube 18. The outer edge 60 of the covering plates 59, assigned to the inner drawing-in and mowing drums 4 and 8, adjoins here a curved guiding wall 72, which forms an S curve, follows the periphery of the respective obliquely conveying drum 69 and is extended up to the drum 4 or 8 by a stripper 73 (FIG. 2), which is brought to the periphery 30 of said drum 4 or 8, for example, in the manner of stripper 31.

In the case of the machine shown, with a total of eight drawing-in and mowing drums 1 to 8, corresponding to a working width of about 6 meters, the cut, harvested crops are conveyed from the outside to the inside through the conveying duct 21, supported by the transverse conveying drums 25 and over the respective obliquely conveying drums 69 to the insertion rollers 10 of the chopper 11. The stream of material, which becomes heavier towards the inside, is forcibly moved forward in the direction of the chopper 11 by the intervention of the driving teeth 26 of the transverse conveying drums 25 in the conveying duct 21. The combining and conveying of the streams of harvested products can be improved further owing to the fact that the axes of rotation of the transverse conveying drums 25, are offset 10 to 25% towards, in each case the outer drawing-in and mowing drums 7 or 6, from the horizontal middle line 50 between the axes of two adjacent drawing-in and mowing drums 7, 6 or 7, 8 in such a manner, that the driving teeth 26 of the transverse conveying drums 25 aggressively convey in the inlet of the gusset region, but disengage themselves better in the runout from the harvested crops stream with respect to the volume increase of the latter.

The dividing joint of the machine frame 12, labeled 74 in FIG. 2, enables this frame to be made larger or smaller according to the modular system as a function of the drawing-in and mowing drums 1 to 8, which are used.

What we claim is:

1. A mowing machine for mowing and chopping stalk-like crops independently of rows while mowing in a forward direction, comprising a frame, a plurality of drawing-in and mowing drums mounted on said frame on either side of a vertical central longitudinal plane of the machine, each of said drums being rotatable about substantially vertical axes, each of said drums including protruding teeth, a vertical guiding wall mounted on said frame and spaced from said drums to define a conveying space between said guiding wall and the respective drum, a central chopper mounted on said frame and receiving said crop from said conveyor space, said guiding wall having the shape of a wave when viewed in plan view with said wave shape having valleys and crests, a first portion of said guiding wall being disposed on one side of said vertical central longitudinal plane and a second portion of said guiding wall being disposed on the other side of said vertical central longitudinal plane, the valleys of said guiding wall being juxtaposed to a respective drum, said valleys of said guiding wall having a configuration corresponding generally to the configuration of the outer periphery of a juxtaposed drum, a conveying body rotatably mounted on said frame for rotation about a substantially vertical axis, said conveying body being disposed juxtaposed to a respective crest of said guiding wall, said conveying body having projecting teeth, said guiding wall having slits juxtaposed to said conveying body, said projecting teeth of said conveying body extending through said slits into said conveying space.

2. A mowing machine according to claim 1 wherein said guiding wall has a sinusoidal configuration.

3. A mowing machine according to claim 1 wherein more than two of said drums are disposed on either side of said vertical central longitudinal plane, the two drums on either side of said longitudinal plane closest to said longitudinal plane having the same diameter and having their drum axes aligned in a transverse plane perpendicular to said longitudinal plane.

4. A mowing machine according to claim 1 wherein said plurality of drums include an outermost drum on either side of said longitudinal plane, said outermost drum and the next juxtaposed drum having a gusset portion therebetween, said gusset portion being devoid of a conveying body.

5. A mowing machine according to claim 1 wherein said guiding wall has extending sections disposed partially about said outermost drum and extending from said outermost drum to the next juxtaposed drum, said extending sections having an outer arcuate part juxtaposed to the outer periphery of said outermost drum.

6. A mowing machine according to claim 1 wherein said vertical guiding wall has extending sections disposed partially about said outermost drum and extending from said outermost drum to the next juxtaposed drum, said extending sections having an outer stripper part juxtaposed to the outer periphery of said outermost drum, said stripper part having slots receiving the projections of said outermost drum.

7. A mowing machine according to claim 1 wherein the valleys of the guide wall between the outermost drum and the juxtaposed drum is devoid of slots.

8. A mowing machine according to claim 1 wherein the crests of the guide wall juxtaposed to said conveying body have slots receiving the projections of the respective conveying body.

9. A mowing machine according to claim 8 further comprising protruding cam strippers mounted on said guide wall at the borders of said slot.

10. A mowing machine according to claim 1 further comprising a partition disposed in the gap between two juxtaposed drums, said partition preventing crops from interacting in said gap.

11. A mowing machine according to claim 1 wherein said guide wall includes successive and alternating valleys and crests, two of said drums being disposed juxtaposed to each of two valleys, said guide wall having a crest between said two valleys, one of said conveying bodies being disposed juxtaposed to the last said wave crest, said two drums rotating in the same direction, said one conveying body rotating in the opposite direction.

12. A mowing machine according to claim 1 wherein said conveying body has a vertical height which is greater than the vertical height of said drums.

13. A mowing machine according to claim 12 wherein said guide wall includes successive and alternating valleys and crests, two of said drums being disposed juxtaposed to each of two valleys, one of said crests being disposed between said two valleys, one of said conveying bodies being disposed juxtaposed to said one crest, said one conveying body having an axis of rotation, said two drums each having an axis of rotation, the mid-point between the axes of said two drums being disposed equidistant from the axes of said two drums, a vertical plane passing through said mid-point between the axes of said two drums and parallel to said longitudinal plane being spaced from a vertical plane parallel to said longitudinal plane and passing through the axis of said one conveying body.

14. A mowing machine according to claim 13 wherein said vertical plane passing through the axis of said one conveying body is further spaced from said longitudinal plane than said plane passing through said mid-point between the axes of said two drums.

15. A mowing machine according to claim 14 wherein said vertical plane passing through the axis of said one conveying body is spaced from said plane passing through said mid-point a distance equal to approximately 10 to 25% of the width of said conveying space.

16. A mowing machine according to claim 1 further comprising covering plates mounted in a fixed position above said drums.

17. A mowing machine according to claim 16 wherein at least one of said drums has one cover plate disposed above said one drum, said one cover plate having an outer edge, said outer edge having a front portion generally facing the direction of forward movement of the machine and a rear portion, said one drum having a cylindrical part from which the teeth of said one drum extend, said cylindrical part having an outer periphery, said front portion of said outer edge of said one cover plate being furtherest removed inwardly from said outer periphery of said cylindrical part than any other portion of said outer edge, said outer edge of said one cover plate in extending from said front portion to said rear portion gradually approaching closer to said outer periphery of said cylindrical part of said one drum.

18. A mowing machine according to claim 17 wherein said outer edge of said one plate has an extending portion extending from said rear portion, said extending portion extending generally tangentially outwardly beyond the outer periphery of said cylindrical part of said one drum.

19. A mowing machine according to claim 18 wherein said extending portion of said outer edge of said one covering plate extends radially outwardly beyond the teeth of said one drum to a position juxtaposed to the teeth of a juxtaposed drum.

20. A mowing machine according to claim 17 wherein said one cover plate mounted in a fixed position above said first drum is designated a first cover plate, further comprising second and third cover plates juxtaposed to said one conveying body, said one conveying body being juxtaposed to said one drum.

21. A mowing machine according to claim 20 wherein said second cover plate is further from said longitudinal axis than said third cover plate, said one conveying body having a plurality of rows of teeth axially spaced from one another including at least one upper row of teeth, said second cover plate being disposed substantially at the same elevation as said first cover plate overlying said first drum, said third cover plate overlying said second drum, said third cover plate being disposed at substantially the same elevation as the upper end of said one conveying body, said third cover plate having an adjoining substantially vertical stripping guide wall having slots for receiving the teeth of said one conveying body.

22. A mowing machine according to claim 16 wherein there is a gap between a first and a second drum, a partition disposed in said gap, said partition being disposed ahead of a conveying drum considered in the direction of forward movement of the machine, said partition preventing crops from interacting in said gap, said partition having a rear end part disposed between said first and second drums, one of said cover plates having an extending section disposed between said first and second drums and disposed in superimposed relationship with said rear end part of said partition, said rear end part of said partition and said extending section of said one cover plate forming a vertical guiding nose which facilitates combining the streams of crops conveyed by said first and second drums.

23. A mowing machine according to claim 22 wherein said guiding nose further includes a generally vertical stripper wall extending to the outer periphery of said one drum, said stripper wall having slots receiving the teeth of said one drum.

24. A mowing machine according to claim 1 wherein the space between the two drums closest to said longitudinal plane on opposite sides of said longitudinal plane and said chopper define feeding gaps for feeding said crops to the chopper, and conveying roller elements disposed in said feeding gaps for conveying said crops to said chopper.

\* \* \* \* \*